(12) United States Patent
Goodwin et al.

(10) Patent No.: US 10,108,993 B2
(45) Date of Patent: Oct. 23, 2018

(54) DATA DRIVEN RULES ENGINE TO DYNAMICALLY CHANGE PRODUCT BUSINESS RULES

(75) Inventors: Devan C. Goodwin, Halifax (CA); Jesus M. Rodriguez, Wake Forest, NC (US); Adrian Likins, Durham, NC (US); Bryan Michael Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1473 days.

(21) Appl. No.: 12/969,437

(22) Filed: Dec. 15, 2010

(65) Prior Publication Data

US 2012/0158413 A1 Jun. 21, 2012

(51) Int. Cl.
| | | |
|---|---|---|
| G06Q 10/10 | (2012.01) | |
| G06Q 30/02 | (2012.01) | |
| G06Q 30/06 | (2012.01) | |
| G06Q 30/00 | (2012.01) | |
| G06F 21/10 | (2013.01) | |

(52) U.S. Cl.
CPC ............ *G06Q 30/06* (2013.01); *G06F 21/10* (2013.01); *G06Q 30/018* (2013.01)

(58) Field of Classification Search
CPC .................................................. G06Q 30/018
USPC .................................................. 705/1.1–912
See application file for complete search history.

(56) References Cited

U.S. PATENT DOCUMENTS

| | | | |
|---|---|---|---|
| 92,228 A | 7/1869 | Thompson | |
| 2,352,060 A | 6/1944 | Wusteney et al. | |
| 4,068,298 A | 1/1978 | Dechant et al. | |
| 6,631,363 B1 | 10/2003 | Brown et al. | |
| 8,121,899 B2 | 2/2012 | Walker et al. | |
| 8,473,593 B1 | 6/2013 | Graham et al. | |
| 9,274,811 B1* | 3/2016 | Reeves ...................... G06F 8/61 | |
| 2001/0049717 A1 | 12/2001 | Freeman et al. | |
| 2002/0059499 A1 | 5/2002 | Hudson | |
| 2002/0099822 A1 | 7/2002 | Rubin et al. | |
| 2004/0024652 A1* | 2/2004 | Buhse et al. ..................... 705/26 | |
| 2004/0199572 A1* | 10/2004 | Hunt ..................... G06F 9/4492 | |
| | | | 709/201 |
| 2004/0205179 A1* | 10/2004 | Hunt ........................ G06F 8/65 | |
| | | | 709/223 |
| 2005/0102240 A1* | 5/2005 | Misra ..................... G06Q 30/06 | |
| | | | 705/59 |
| 2006/0059253 A1 | 3/2006 | Goodman et al. | |
| 2007/0198429 A1 | 8/2007 | Coley et al. | |
| 2007/0289028 A1 | 12/2007 | Vaughan et al. | |

(Continued)

OTHER PUBLICATIONS

Mandl et al., IBM ILOG BRMS, IBM Websphere Technical Sales Presentation, 20052010, pp. 1-32.*

(Continued)

*Primary Examiner* — Jonathan P Ouellette

(74) *Attorney, Agent, or Firm* — Lowenstein Sandler LLP

(57) ABSTRACT

A server stores current rules for one or more products in a data store. The current rules are independent of product code of the one or more products. The current rules determine whether an entity satisfies one or more product attributes to allow the entity to use the one or more products. The server implements new rules without changing the product code of the one or more products and determines whether an entity satisfies one or more product attributes to allow the entity to use the one or more products by using the new rules.

17 Claims, 6 Drawing Sheets

(56) References Cited

U.S. PATENT DOCUMENTS

| | | | |
|---|---|---|---|
| 2008/0091454 A1 | 4/2008 | Fisher, Jr. | |
| 2008/0215492 A1 | 9/2008 | Pieper et al. | |
| 2008/0313632 A1 | 12/2008 | Kumar et al. | |
| 2008/0320582 A1* | 12/2008 | Chen et al. | 726/12 |
| 2009/0177698 A1 | 7/2009 | Chan et al. | |
| 2009/0249327 A1* | 10/2009 | Cognigni | G06F 21/105 717/174 |
| 2009/0271322 A1* | 10/2009 | Lay | G06Q 20/0453 705/75 |
| 2011/0321178 A1 | 12/2011 | Desai et al. | |
| 2012/0005041 A1 | 1/2012 | Mehta et al. | |
| 2012/0054107 A1 | 3/2012 | Biswas et al. | |
| 2012/0089549 A1* | 4/2012 | Burckart | G06Q 10/0635 706/47 |
| 2012/0197811 A1 | 8/2012 | Kearney et al. | |
| 2012/0221444 A1 | 8/2012 | Bowes et al. | |
| 2012/0221709 A1 | 8/2012 | Bowes et al. | |

OTHER PUBLICATIONS

USPTO Office Action for U.S. Appl. No. 13/034,115 dated Mar. 17, 2015.
USPTO Office Action for U.S. Appl. No. 13/035,734 dated Mar. 4, 2015.
USPTO Office Action for U.S. Appl. No. 13/018,633 dated Mar. 9, 2015.
Rekhter et al., Address Allocation for Private Internets, Network Working Group.
USPTO Restriction Requirement for U.S. Appl. No. 13/034,115 dated Feb. 1, 2013.
USPTO Office Action for U.S. Appl. No. 13/034,115 dated Apr. 10, 2013.
USPTO Office Action for U.S. Appl. No. 13/034,115 dated Oct. 9, 2013.
USPTO Office Action for U.S. Appl. No. 13/034,115 dated Oct. 8, 2014.
USPTO Office Action for U.S. Appl. No. 13/035,734 dated Feb. 15, 2012.
USPTO Office Action for U.S. Appl. No. 13/035,734 dated Jul. 18, 2012.
USPTO Office Action for U.S. Appl. No. 13/035,734 dated Jun. 19, 2014.
USPTO Office Action for U.S. Appl. No. 13/035,734 dated Oct. 10, 2014.
USPTO Office Action for U.S. Appl. No. 13/018,633 dated Jan. 14, 2013.
USPTO Office Action for U.S. Appl. No. 13/018,633 dated Jul. 17, 2013.
USPTO Office Action for U.S. Appl. No. 13/018,633 dated Aug. 15, 2014.

\* cited by examiner

DATA DRIVEN RULES ENGINE TO DYNAMICALLY CHANGE PRODUCT BUSINESS RULES

TECHNICAL FIELD

Embodiments of the present invention relate to product asset management. Specifically, the embodiments of the present invention relate to dynamically changing product business rules.

BACKGROUND

A software provider can sell a number of different software and/or service products, for example, by selling subscriptions to customers for the software and service products. An entity that has purchased a subscription to a product is an owner of the subscription. A purchase of a subscription is an owner's right to use the product for the period of the subscription. An owner's use of a subscription can be represented, for example, as an 'entitlement.' For example, a customer, such as ACME Company, purchases ten 3-year subscriptions to Enterprise Software ABC and thus, ACME Company is an owner of the ten subscriptions. Ten entitlements represent the ten subscriptions. An owner can then assign the ten entitlements, for example, to various systems. When the owner installs the Enterprise Software ABC on a computing system, the computing system is granted one of the ten entitlements.

Software providers can sell product subscriptions based on product business models. For example, the product business model for Enterprise Software ABC may be to sell subscriptions to the Enterprise Software ABC on a per-CPU-socket-pair basis. Each of ACME Company's ten entitlements are valid for systems that each have two populated CPU sockets. Thus, ACME Company must assign two entitlements to a system that has four populated CPU sockets.

Typically, the enforcement of a software provider's product business model for a particular product is hard-coded in the product source code itself. For example, the product source code for Enterprise Software ABC is hard-coded to enforce the entitlements for the Enterprise Software ABC on a 'per-CPU-socket-pair' basis. The software provider's product marketing department may wish to change the product business model of its Enterprise Software ABC from the 'per-CPU-socket-pair' basis to the 'per-core-per-CPU' to increase revenue.

Conventional solutions require the software developers to change the product source code for the Enterprise Software ABC to enforce the entitlements on a 'per-core-per-CPU' basis. The change may be made to the Enterprise Software ABC product source code, but the operable product code, which is distributed to customers to implement the change, may not yet be released. A software provider usually releases the operable product code according to a predetermined product code release schedule. The product code release may not occur until three to six months from when the software provider's product marketing department made the initial request. A software provider's sales department cannot sell subscriptions for the Enterprise Software ABC on a 'per-core-per-CPU' basis until the product code, which enforces the new product business model, is released. Thus, there can be a significant amount of time between making a request to change a product business model, hard-coding the changes into the product source code, and releasing the changed operable product code, which can result in a large amount of lost potential revenue. Conventional solutions do not provide a software provider the flexibility to easily change its product business models.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for dynamically changing product business rules to enforce product business models. A server stores current rules for one or more products in a data store. The current rules are independent of the product code for the one or more products. The current rules determine whether an entity satisfies one or more product attributes to allow the entity to use the one or more products. The server implements new rules without changing the product code of the one or more products and determines whether an entity satisfies one or more product attributes to allow the entity to use the one or more products by using the new rules. Embodiments of the present invention provide user flexibility to implement changes to the product business rules on-the-fly independent of the product code, and thus increase a software provider's potential revenue. Embodiments of the present invention can also implement changes to the product business rules independent of the server side code, and thus, implement new product business rules on-the-fly without a server side code release or without incurring server side downtime.

Figure 1:
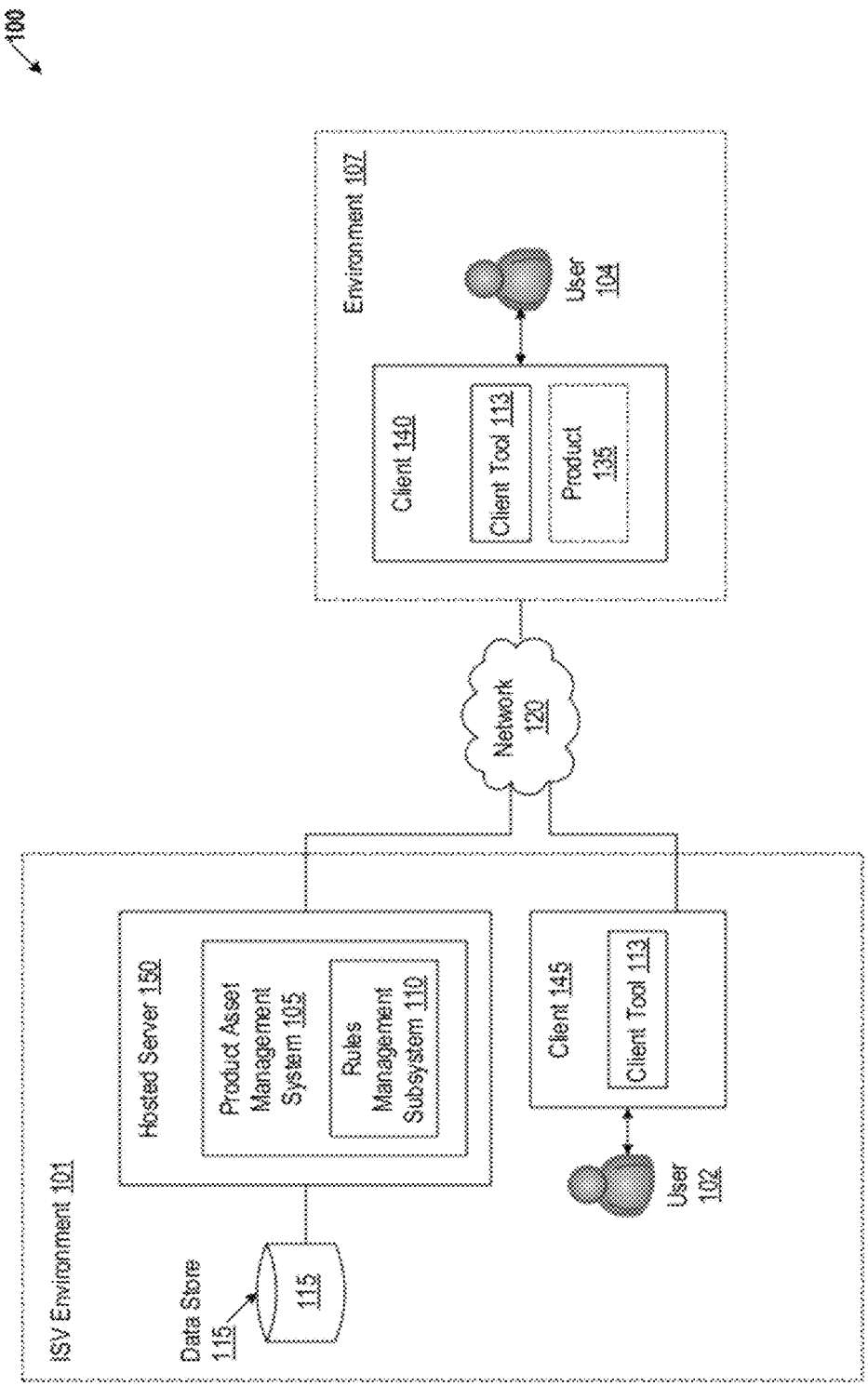
FIG. 1 is an exemplary network architecture in which embodiments of the present invention may operate.

FIG. 1 is an exemplary network architecture 100 in which embodiments of the present invention can be implemented. Embodiments of the invention are directed to a method and system for dynamically changing product business rules to enforce product business models. The network architecture 100 can include a software provider environment, such as independent software vendor (ISV) environment 101, communicating with one or more customer environments 107 via a network 120. An environment 107 includes one or more clients 140 communicating with the server 150 via the network 120. The network 120 can be a local area network (LAN), such as an intranet within a company, a wireless network, a mobile communications network, a wide area network (WAN), such as the Internet, or similar communication system. The network 120 can include any number of networking and computing devices such as wired and wireless devices.

Software providers can develop and/or sell one or more software products and/or service products. A software provider can be a large software company that develops and sells operating system platforms, an independent software vendor (ISV) that develops and sells specialized software to run on an operating system platform, and/or an independent service provider (ISP) that does not develop, but sells software products and/or service products. For brevity and simplicity, an ISV is used as an example of a software provider throughout this document.

Customers can purchase subscriptions to the software and service products. An entity that has purchased a subscription to a product is an owner of the subscription. A purchase of a subscription is an owner's right to use the product for the period of the subscription. An owner's use of a subscription can be represented, for example, as an 'entitlement.' Software may or may not already be installed on an entity. Software that is already installed on an entity can be somewhat usable, even if the entity is not granted an entitlement for the installed software. When an entity is granted an entitlement for the software, the entity can access a product repository to allow the entity to receive software updates. For example, an ISV develops and sells a software product called Enterprise Software ABC. A customer, ACME Company, purchases ten 3-year subscriptions to Enterprise Software ABC, which is represented by ten entitlements. ACME Company may already have the Enterprise Software ABC already installed in one or more systems. When the one or more systems are granted entitlements for the Enterprise Software ABC, the systems can receive updates for the Enterprise Software ABC.

An entity can be a potential consumer or an existing consumer of an entitlement. A consumer is an entity that has been granted an entitlement to allow the entity to consume (use) one or more products and to grant the entity access to one or more product repositories for receiving product updates. For example, when an entity is granted an entitlement for the Enterprise Software ABC, the entity is a consumer of the Enterprise Software ABC. Examples of entities include, and are not limited to, a person, a client computing system, a server computing system, a domain, etc.

Software providers and customers can track which product subscriptions have been purchased and which of the purchased subscriptions have been consumed. The tracking of purchased and consumed products is hereinafter referred to as 'product asset management.' A software provider environment, such as ISV environment 101, can include a server 150. A server 150 can be hosted by any type of computing device including server computers, gateway computers, desktop computers, laptop computers, hand-held computers or similar computing device. An exemplary computing device is described in greater detail below in conjunction with FIG. 4. The server 150 can host a product asset management system 105 for tracking what products an owner has purchased and which of the products an owner has consumed (e.g., make use of a product).

In one embodiment, the product asset management system 105 is a web application hosted by a server (e.g., server 150), and accessible via a client tool 113 hosted by a client 140,145. For example, ACME Company may be a small customer, and its environment 107 can include one or more clients 140 that can communicate to the server 150 in the ISV environment 101. An example of the product asset management system 105 can include, and is not limited to, a web application based on a REST (Representational State Transfer) client-server architecture. In one embodiment, a client tool 113 is a programmatic REST interface to communicate with the product asset management system 105. Other examples of a client tool 113, can include and are not limited to, a web interface, web browser, or other client software. The client machines 140,145 can be hosted by any type of computing device including server computers, gateway computers, desktop computers, laptop computers, mobile communications devices, cell phones, smart phones, hand-held computers, or similar computing device. An exemplary computing device is described in greater detail below in conjunction with FIG. 4.

The client 140 entity can send a request to to the product asset management system 105 via the client tool 113 for an entitlement in order to access one or more product repositories (e.g., a repository for product 135), which are coupled to the product asset management system. The product (e.g., product 135) in the repository can be installed on the client 140 as a separate event. The product asset management system 105 can receive the request and grant the client 140 an entitlement for the product 135. When client 140 is granted an entitlement for the Enterprise Software ABC, one of the ten entitlements is consumed by the client 140, and the client 140 becomes a consumer of the Enterprise Software ABC. The server 150 can store data of the products which a customer has purchased and consumed in a data store 115 that is coupled to the server 150. A data store 115 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Software providers can sell product subscriptions and entitlements based on product business models. For example, a subscription to Enterprise Software ABC may be sold on a per-CPU-socket-pair basis. A customer, such as, ACME Company, may have one system, which has two populated CPU sockets, and another system, which has four populated CPU sockets. The system having two populated CPU sockets would consume one entitlement and the system having four populated CPU sockets would consume two entitlements. Thus, ACME Company should purchase at least three subscriptions to the Enterprise Software ABC, which may be represented by three entitlements, for its two systems.

Typically, the enforcement of the software provider's product business models is hard-coded in the product source code itself. For example, traditionally, the product source code for Enterprise Software ABC is hard-coded to enforce the entitlements for the Enterprise Software ABC on a 'per-CPU-socket-pair' basis. Embodiments of the product asset management system 105 provide a rules management subsystem 110 that can dynamically change product business rules to enforce new product business models without changing the product source code and operable product code (product code). Product business models can dynamically be changed, for example, based on hardware, such as, a number of CPU sockets (e.g., per-2-sockets, per-4-sockets, etc.), per CPU, per CPU/Core, based on a time interval (e.g., per hour), based on a number of virtual guests, etc., and a combination of such.

The rules management subsystem 110 can store product business rules in a data store 115 for enforcing the product business models. The rules management subsystem 110 can store a current set of product business rules in the data store 115 for one or more products and use the current rules to enforce the current product business models. The current rules are separate from the product code for the products and independently executed from the product code. The current rules can be defined using a scripting language or other programming language, can be in a format of a data file, can be in a format of an XML file, etc. In one embodiment, the current rules are pluggable JavaScript. The rules management subsystem 110 can execute the current rules to determine whether an entity satisfies one or more product attributes to allow an entity to use a product. For instance, the rules management subsystem 110 determines whether an entity, such as client 140, has no more than two populated CPU sockets and grants one entitlement for Enterprise Software ABC if the client 140 has no more than two populated CPU sockets. One embodiment of using the current rules to enforce current product business models is described in greater detail below in conjunction with FIG. 2B.

The rules management subsystem 110 can dynamically change the current rules to enforce new product business models without changing the product code. The rules management subsystem 110 can receive user input of the new product business models, use the input to generate new rules, and implement the new rules on-the-fly. For example, the rules management subsystem 100 replaces the current rules in the data store 115 with the new rules. One embodiment of a method for changing product business rules is described in greater detail below in conjunction with FIG. 3.

In one embodiment, the user input of the new product business models is sent to the rules management subsystem 110 via an API call. For example, user 102, such as an ISV system administrator, can use a CLI command to push the user input to the rules manager 210. In another embodiment, the client tool 113 can generate and provide a user interface to receive the input for generating the new rules set. The rules management subsystem 110 can compile the user input at runtime to generate the new rules and store/upload the new rules, for example, in plain text (e.g., JavaScript). The new rules can be stored as a data file. Subsequently, when the product asset management system 105 receives a request from an entity, such as a request from a client 140 to grant an entitlement for a product, the rules management subsystem 110 can use the new rules in the data store 115 to determine whether to grant the entitlement.

Figure 2A:
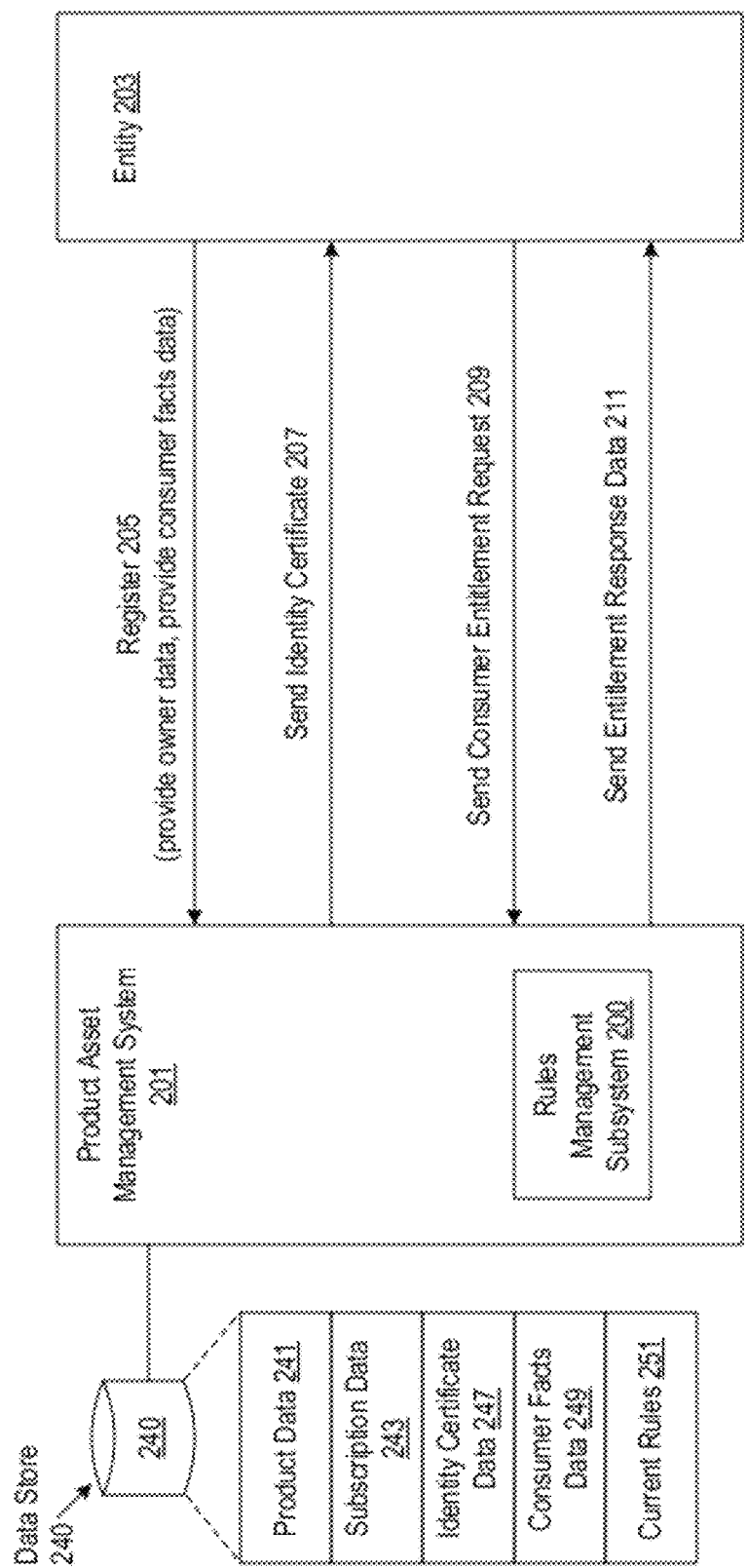
FIG. 2 is a block diagram of one embodiment of rules management subsystem.

FIG. 2A is a block diagram of one embodiment of an entity 203 (e.g., client 140 in FIG. 1) registering with a product asset management system 201 (e.g., product asset management system 105 in FIG. 1). For example, the entity 203 is part of a small customer environment, ACME Company environment. A user, such as an ACME Company system administrator, registers the entity 203 with the product asset management system 201 and wishes the entity 203 to have access a product repository for the Enterprise Software ABC.

In order to receive an entitlement for a product, an entity (e.g., client system, server system, etc.) registers itself with a server that hosts a product asset management system (e.g., server 150 in FIG. 1). During the registration process, the entity 203 sends data 205 to the product asset management system 201. The data can include data that associates the entity with an owner (e.g., ACME Company). The data can also includes consumer facts data, which is data related to the hardware of an entity that is a potential consumer (e.g., entity 203) and/or the hardware of an entity that is already a consumer. Examples of the consumer facts data 249 can include, and are not limited to, the architecture (e.g., x86_64, i686, x390x, etc.) of the entity system, the entity type (e.g., system, person, domain, etc.), the number of CPU sockets in the entity system, the number of populated CPU sockets in the system, the number of cores per CPU in the system.

A client tool (e.g., client tool 113 in FIG. 1) can determine the consumer facts data 249 for the entity and send the consumer facts data 249, as well as other registration data (e.g., ownership data, etc.), to the product asset management system 201. The client tool can generate and provide a user interface to display the consumer facts data 249 that is sent to the product asset management system 201 for a user, such as a system administrator, to view. The user interface can be a graphical user interface (GUI). The product asset management system 201 receives and stores the consumer facts data 249 and registration data in a data store 240 that is coupled to the product asset management system 201.

The product asset management system 201 can assign and send 207 an identity certificate to the entity 203, which the entity 203 can subsequently use to authenticate itself when communicating with the product asset management system 201. The product asset management system 201 can be coupled to a data store (e.g., data store 240) that stores identity certificates to assign to registered entities. The product asset management system 201 can store identity certificate data 247 that associates the entity with the assigned identity certificate in the data store 240. During and/or subsequent to the registration process, the entity 203 can send a consumer entitlement request 209 to the product asset management system 201, for example, via the client tool. Examples of a consumer entitlement request can include, and are not limited to, a request for a list of product subscriptions that are available to the entity 203, a request for the product asset management system 201 to grant an entitlement for a particular product to the entity 203 to allow the entity 203 to use the product, etc. The product asset management system 201 can include a rules management subsystem 200 to determine the entitlement response data for the consumer entitlement request. One embodiment of the rules management subsystem determining the entitlement response data is described in greater detail below in conjunction with FIG. 2B. Examples of entitlement response data can include, and are not limited to, the list of product subscriptions that are available to the entity 203, data indicating whether an entitlement for a particular product is granted to the entity 203, etc. The product asset management system 201 sends 211 the entitlement response data to the entity 203.

The rules management subsystem 200 hosts a data driven rules engine to enforce product business models. The rules management subsystem 200 stores product business rules, such as current rules 251, for enforcing product business models for one or more products. The current rules 251 can be defined using a scripting language or other programming language, can be in a format of a data file, can be in a format of an XML file, etc.

The current rules 251 are separate from the product code and independently executed from the product code. The product source code and operable product code can be stored and maintained in a code repository. The rules management subsystem 200 can receive user input to generate the current rules 251 and store the rules in the data store 240 that is coupled to the rules management subsystem 200, according to one embodiment. One embodiment of generating the product business rules is described in greater detail below in conjunction with FIG. 2C. The rules management subsystem 200 can dynamically change the product business rules (e.g., current rules 251) to enforce new product business models without changing the product code.

Figure 2B:
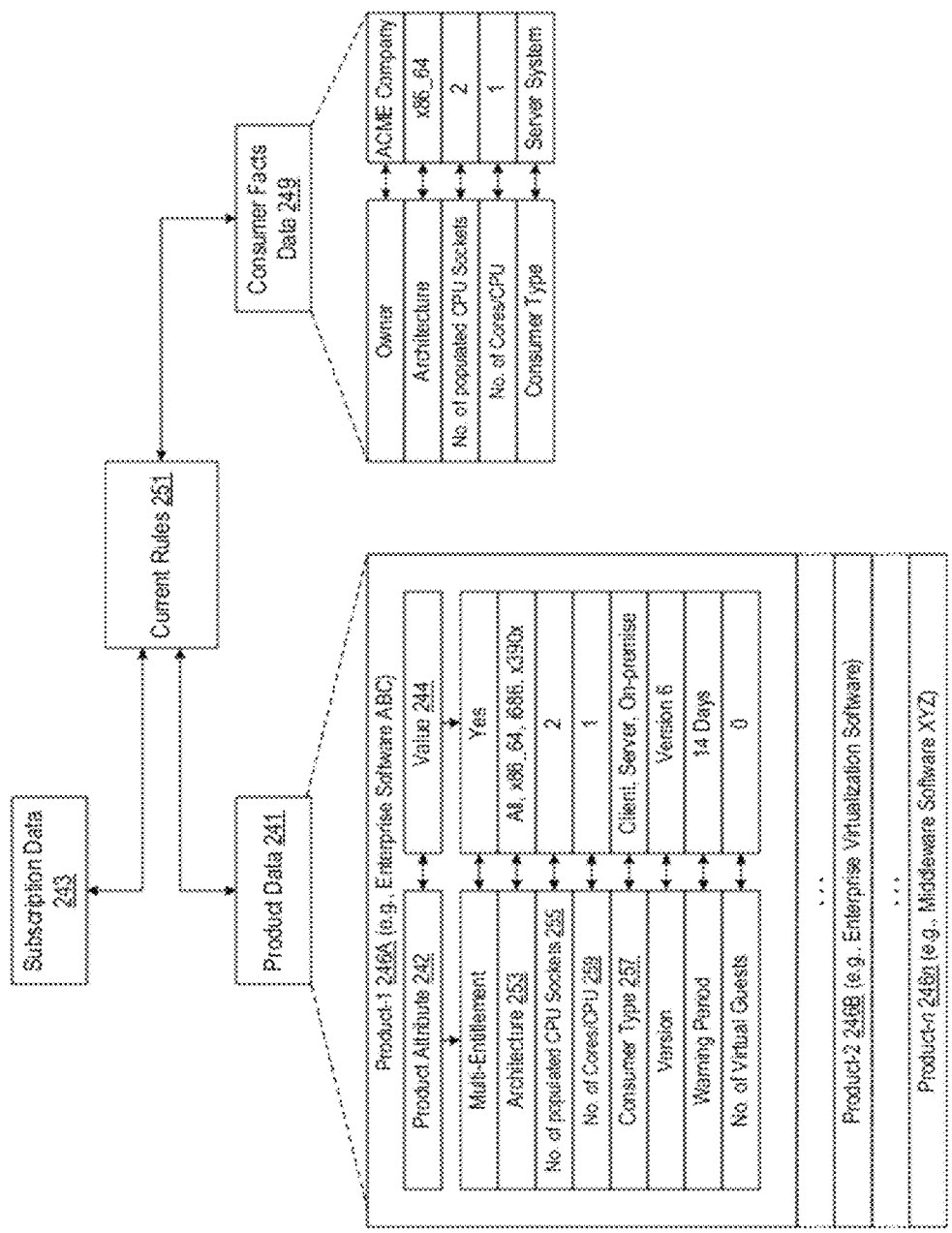

The current rules 251 can enforce product business models by determining the appropriate entitlement response data for a consumer entitlement request (e.g., request sent by an entity at reference 209). The current rules 251 compare the consumer facts data 249 of an entity to product data 241, which defines one or more products, and to subscription data 243, which represents the products that the owners have purchased. The product data 241 and subscription data 243 can be stored in one or more data stores (e.g., data store 240) that is coupled to the rules management subsystem 200. FIG. 2B is a block diagram illustrating the use of the current rules 251 to compare the consumer facts data 249 to product data 241 and subscription data 243, in accordance to one embodiment. The use of the current rules allow a user to enforce product business models (e.g., to determine the entitlement response data). For example, when executed, the current rules 251 can determine which subscriptions are available to an entity 203 and/or whether to grant an entitlement for a product to an entity 203.

The product data 241 can include product attributes 242 and the values 244 assigned to the product attributes 242 for each product (e.g., products 246A,B,n). Examples of product attributes 242 can include, and are not limited to, the entitlement type that is supported by the product (e.g., multi-entitlement allows a consumer to consume an entitlement more than once), architecture types that are supported by a product, the number of CPU sockets in a system that are supported by a product, the number of populated CPU sockets in a system that are supported by a product, the number of cores/CPU in a system that are supported by a product, the consumer types that are supported by a product, the version of the product, the period of time to send a warning that a product subscription is going to expire, the number of virtual guests supported by a product, etc. The product data 241 can be existing internal data, for example, that is maintained by a software provider sales and/or accounting departments or can be a copy of the existing data.

When the rules management subsystem 200 receives a consumer entitlement request (e.g., request sent by an entity at reference 209 in FIG. 2A), it can execute the current rules 251 to determine a list of product subscriptions that are available to an entity or to determine whether an entitlement for a particular product to be granted to the entity. The consumer entitlement request can include a request identifier identifying the type of response requested (e.g., list of available subscriptions) and a consumer identifier (e.g., identity certificate).

When the request is for a list of product subscriptions that are available to an entity, the current rules 251 can identify the consumer facts data 249 for the entity that is stored in a data store (e.g., data store 240) and compare the consumer facts data 249 to the product data 241 for one or more products to determine which product attributes 242 are satisfied. For example, the current rules 251 compare the 'x86_64' architecture, '2' CPU sockets, and 'server system' consumer type in the consumer facts data 249 to the product data 241 for product identifier 246 (e.g., Enterprise Software ABC). The current rules 251 find that the 'x86_64' architecture, '2' CPU sockets, and 'server system' consumer type in the consumer facts data 249 satisfies the values 244 of the product attributes 242 for Enterprise Software ABC. The current rules 251 can continue to compare the consumer facts data 249 to the product data 241 for other products (e.g., products 246B,n) to determine which product attributes 242 for which products 246B,n are satisfied by the consumer facts data 249. For example, the current rules 251 may find that the consumer facts data 249 also satisfies the values 244 for the product attributes 242 for Product-n 246n (e.g., Middleware Software XYZ).

The current rules 251 can examine the subscription data 243, which is in the data store, associated with the owner identified in the consumer entitlement request to determine whether the owner (e.g., ACME Company) has purchased subscriptions for the products that are associated with the satisfied product attributes. The current rules 251 can locate the owner's purchasing data 241 based on the owner identifier in the request. The subscription data 243 can include, and is not limited to, data representing the products that one or more owners have purchased, the quantity of the purchased products, the time period the purchase is valid for, etc. For example, the subscription data 243 indicates that Owner_A (e.g., ACME Company) has purchased one hundred 3-year subscriptions to Enterprise Software ABC and fifty 1-year subscriptions to Enterprise Virtualization Software. Examples of subscription data 243 can include, and are not limited to, an owner identifier, product identifiers, subscriptions identifiers, entitlement identifiers, validation identifiers, etc. The subscription data 243 can be existing internal data, for example, that is maintained by a software provider sales and/or accounting departments or can be a copy of the existing data.

In the above example, the current rules 251 determine that the consumer facts data 249 satisfies the product attributes for the Enterprise Software ABC 246A and the product attributes for the Middleware Software XYZ 246n. The current rules 251 also determine from the subscription data 243 that the ACME Company has purchased subscriptions to the Enterprise Software ABC and the Enterprise Virtualization Software. ACME Company has not purchased any subscriptions to Middleware XYZ. The current rules 251 generate entitlement response data that includes a list of product subscriptions that are available to the entity, which includes only the Enterprise Software ABC product, and sends the entitlement response data to the entity.

When the request is for an entitlement for a particular product to be granted to the entity, the current rules 251 can identify the consumer facts data 249 for the entity and a product identifier in the request. For example, the request is for an entitlement for Middleware XYZ. The current rules 251 can compare the consumer facts data 249 to the product data 241 for the Product-n 246n (e.g., Middleware XYZ) to determine if product attributes 242 for Middleware XYZ are satisfied. The current rules 251 may find that the consumer facts data 249 satisfies the values 244 for the product attributes 242 for Product-n 246n (e.g., Middleware Software XYZ) and can examine the subscription data 243 associated with the owner identified in the consumer facts data 249 to determine whether the owner (e.g., ACME Company) has purchased any subscriptions for the product associated with the satisfied product attributes (e.g., Middleware Software XYZ). ACME Company has not purchased any subscriptions to Middleware XYZ and the current rules 251 generate and send entitlement response data indicating that the entitlement request is denied, according to one embodiment.

Figure 2C:
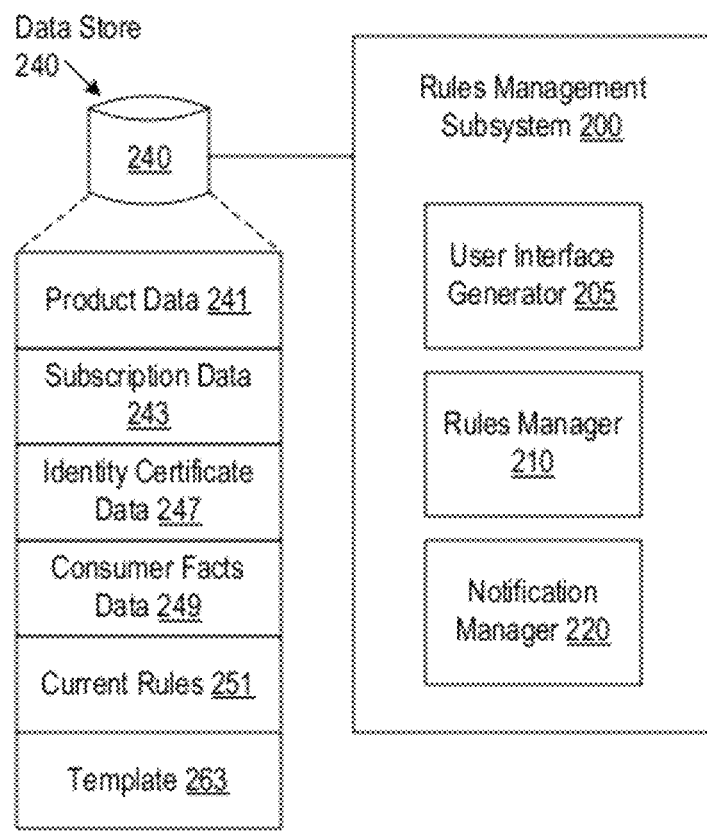

FIG. 2C is a block diagram of one embodiment of a rules management subsystem 200 for dynamically changing product business rules to enforce product business models. The rules management subsystem 200 can be the same as the rules management subsystem 110 in a product management system 105 hosted by a server 150 of FIG. 1. The rules management subsystem 200 can be coupled to one or more data stores 240 that store product data 241, subscription data 243, identity certificate data 247, consumer facts data 249, and current rules 251. The rules management subsystem 200 can include a user interface generator 205, a rules manager 210, and a notification manager 220.

The current rules 251 can be user-defined. For example, a user, such as an ISV system administrator, can provide input for the current rules 251. The user input can be based on data that defines the product business models, such as data from a product marketing department, sales department, and/or accounting department.

The user input can specify the parameters defining whether the consumer facts data 249 satisfies the examined product attributes 242. For example, the number of CPU sockets in the consumer facts data 249 must be equal to or less than the number of CPU sockets in the product data 251 for the product attribute 242 to be satisfied. The user input can also specify actions for the rules management subsystem 200 to execute based on the comparison of the consumer facts data 249 to the product attributes 242. For example, if the number of populated CPU sockets in the consumer facts data 249 does not match the number of populated CPU sockets in the product data 241, the rules management subsystem 200 generates a warning.

Examples of the user input can include, and are not limited to, modifications made to a template 263 (e.g., code that includes statements defining default rules), modifications made to code that includes statements defining an existing set of rules, user input of code that includes statements defining a new set of rules, etc. The current rules 251 can be defined using a scripting language or other programming language, can be in a format of a data file, can be in a format of an XML file, etc. In one embodiment, the current rules 251 are pluggable JavaScript. For example, a system administrator can access and modify code, or a copy of the code, that includes statements defining a default set of rules (e.g., template 263).

The rules manager 210 can receive the user input and generate the current rules 251. In one embodiment, the user input is sent to the rules manager 210 via an API call. For example, a system administrator, can use a CLI command to push the user input to the rules manager 210. In another embodiment, the UI (user interface) generator 205 can generate and provide a user interface to a client to receive the input for generating the rules set. When the rules manager 210 receives the user input, the rules manager 210 can compile the user input at runtime to generate the current rules 251 and store/upload the current rules 251, for example, in plain text (e.g., JavaScript). The current rules 251 can be stored as a data file.

The rules manager 210 can receive a request to change the current rules 251 (e.g. receive user input for new rules). For example, instead of comparing the number of populated CPU sockets product attribute (e.g., attribute 255 in FIG. 2B) in the product data to the consumer facts data 249, the user input specifies the new rules to compare the number of cores per populated CPU sockets product attribute (e.g., attribute 259 in FIG. 2B) in the product data to the consumer facts data 249. Examples of the user input to change the current rules 251 can include, and are not limited to, modifications made to a template 263 (e.g., code that includes statements defining default rules), modifications made to code that includes statements defining an existing set of rules (e.g., current rules 251), user input of code that includes statements defining a new set of rules, etc. The new rules can be defined using a scripting language or other programming language, can be in a format of a data file, can be in a format of an XML file, etc. In one embodiment, the new rules are pluggable JavaScript. For example, a system administrator can modify code that includes statements defining the current rules. The rules manager 210 can receive the user input for the new rules set and can compile the user input at runtime to generate the new rules and store/upload the new rules, for example, in plain text (e.g., JavaScript). The new rules can be stored as a data file. The new rules are separate from the product code for the products.

The rules manager 210 can implement the new rules on-the-fly. In one embodiment, the rules manager 210 replaces the current rules 243 in the data store 240 with the new rules. For example, the rules manager 210 replaces the data file of the current rules with the data file of the new rules. In another embodiment, the rules manager 210 adds the data file for the new rules to the data store 240 and uses it as the current rules 251 for enforcing the product business models. For example, the rules manager 210 executes the most recent rules data file that is stored in the data store 240.

The rules manager 210 can receive a consumer entitlement request and execute the current rules 251 (e.g., most recent rules data file) to determine the entitlement response data for the request. For example, the current rules 251 determine and generate entitlement response data indicating the list of product subscriptions that are available to an entity and/or data indicating whether an entitlement request is granted.

The rules manager 210 can send the entitlement response data to an entity. In one embodiment, a client tool can generate a GUI to display the entitlement response data for an entity (e.g., subscriptions that are available to the entity, determination of whether an entitlement is granted or not, warning message, error message, etc.). In another embodiment, the notification manager 220 can generate a notification containing the entitlement response data for an entity. Examples of notifications can include, and are not limited to, messages communicated via a network (e.g., email messages, text messages, instant messages, social network messages, etc.), visual/sound alarm indicators on a client device, etc.

Figure 3:
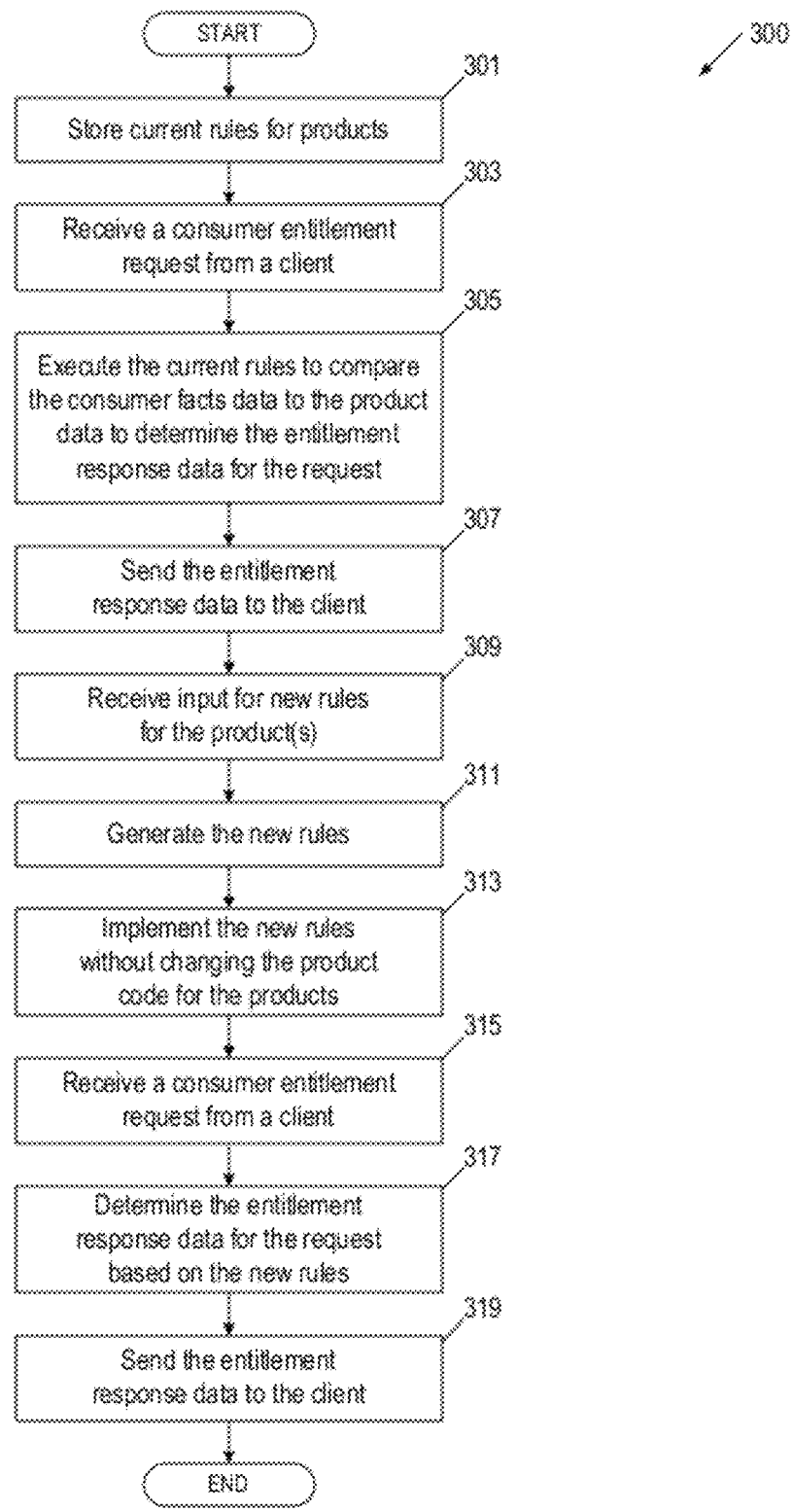
FIG. 3 is a flow diagram of an embodiment of a method for dynamically changing product business rules to enforce product business models.

FIG. 3 is a flow diagram of an embodiment of a method 300 for dynamically changing product business rules to enforce product business models. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the rules management subsystem 110 hosted by a server 150 of FIG. 1.

In one embodiment, the method 300 starts with the rules management subsystem coupled to a data store storing current rules for one or more products for enforcing product business models at block 301. In one embodiment, the current rules is the most recent rules data file that is stored in the data store. In another embodiment, the current rules are the rules that are marked by the rules management subsystem to be used for enforcing the product business models. The rules management subsystem is also coupled to a data store that stores registration data and consumer facts data for entities which have registered with a product asset management system.

At block 303, the rules management subsystem receives a consumer entitlement request from a client (e.g., an entity). Examples of a consumer entitlement request can include, and are not limited to, a request for a list of product subscriptions that are available to an entity, a request to grant an entitlement for a particular product to an entity to allow the entity to use the product, etc. A request can include for example, and is not limited to, a request type identifier (e.g., a request for an entitlement for a particular product, a request for available subscriptions for an entity, etc.), an identity certificate, a product identifier, etc.

At block 305, the rules management subsystem executes the current rules to compare the consumer facts data associated with the entity to the product data for one or more products to determine the entitlement response data for the request. The current rules determine whether the consumer facts data for the entity satisfies one or more product attributes in the product data to allow the entity to use the one or more products. The current rules then examine the subscription data associated with the owner identified and/or identity certificate in the consumer entitlement request to determine whether the owner has purchased subscriptions for the products that have satisfied product attributes.

For example, the rules management subsystem receives a consumer entitlement request for a list of subscriptions that are available to an entity. The rules management subsystem identifies the consumer facts data that is stored in the data store for the entity based on the identity certificate and compares the consumer facts data to product data for one or more products to determine which product attributes in the product data are satisfied. The rules management subsystem then identifies the subscription data that is associated with the identity certificate and determines whether the owner has purchased any subscriptions for the products which have product attributes that are satisfied.

In another example, the rules management subsystem receives a consumer entitlement request to grant an entitlement for a product to allow the entity to use the product. The consumer entitlement request includes a product identifier and an identity certificate. The rules management subsystem identifies the consumer facts data for the entity based on the identity certificate and compares the consumer facts data to product data that is associated with the product identifier to determine which product attributes in the product data are satisfied. The rules management subsystem then identifies the subscription data that is associated with the identity certificate and determines whether the owner has purchased any subscriptions for the product if the product attributes are satisfied. In another example, when the request is for an entitlement for a particular product, the rules management subsystem can determine and send the best entitlement to the client based on the current rules. For example, an owner, ACME Company, purchased ten 1-year subscriptions to Enterprise Software ABC and ten 3-year subscriptions to Enterprise Software ABC. The consumer entitlement request can include data indicating a time period for when the entity wishes the entitlement to be valid for and the rules management subsystem can determine whether an entitlement for the 1-year subsciption or the 3-year subscription is the best entitlement to grant to the entity.

At block 307, the rules management subsystem generates and sends the entitlement response data to the client (e.g., a list of subscriptions that are available to the entity, data indicating that an entitlement is granted), etc.). The rules management subsystem can generate and send a message to the client indicating that the product attributes are not satisifed by the consumer facts data for the entity. Examples of messages can include, and are not limited to, error messages, warning messages, etc. In one embodiment, the rules management subsystem sends a notification pertaining to the entitlement response data to a user, such as a system administrator. Examples of notifications can include, and are not limited to, messages communicated over a network (e.g., email messages, text messages, instant messages, social network messages, etc.), visual/sound alarm indicators on a client device (e.g., client computing system 140 in FIG. 1), etc.

Product business models may change. For example, an ISV may wish to change its product business model for its Enterprise Software ABC product to now be sold based on a number of cores in each CPU in the entity system. At block 309, the rules management subsystem receives the input for new rules. The rules management subsystem can receive user input for the new rules, for example, from a system administrator. Examples of the user input can include, and are not limited to, modifications made to code that includes statements defining default rules, modifications made to code that includes statements defining an existing set of rules, user input of code that includes statements defining a new set of rules, etc. The new rules can be defined using a scripting language or other programming language, can be in a format of a data file, can be in a format of an XML file, etc. In one embodiment, the new rules are pluggable JavaScript.

At block 311, the rules management subsystem uses the user input and compiles the user input at runtime to generate the new rules. For example, instead of comparing the number of populated CPU sockets product attribute in the product data to the consumer facts data, the new rules compare the number of cores per populated CPU sockets product attribute in the product data to the consumer facts data. The rules management subsystem can store/upload the new rules, for example, in plain text (e.g., JavaScript). The new rules can be stored as a data file.

At block 313, the rules management subsystem implements the new rules on-the-fly without changing the product code for the products. In one embodiment, the rules management subsystem replaces the data file of the current rules in the data store with the data file of the new rules. In another embodiment, the rules management subsystem adds the data file for the new rules to the data store and the rules management subsystem can execute the most recent rules data file that is stored in the data store. In another example, the rules management subsystem flags the new rules to be used for enforcing the product business models.

At block 315, the rules management subsystem receives a consumer entitlement request and determines the entitlement response data to send to the client based on the new rules at block 317. At block 321, the rules management subsystem sends the entitlement response data to the client. For example, the consumer entitlement request is a request to grant Entity-A an entitlement for Enterprise Software ABC. The rules management subsystem executes the current rules (e.g., new rules marked to be used as the current rules, most recent rules data file that is stored in the data store, etc.) to compare the number of cores per populated CPU sockets in the product data to the consumer facts data for Entity_A. The rules management subsystem determines that the consumer facts data satisfies the number of cores per populated CPU sockets in the product data and sends the entitlement response data to the entity indicating that the entitlement is granted.

Figure 4:
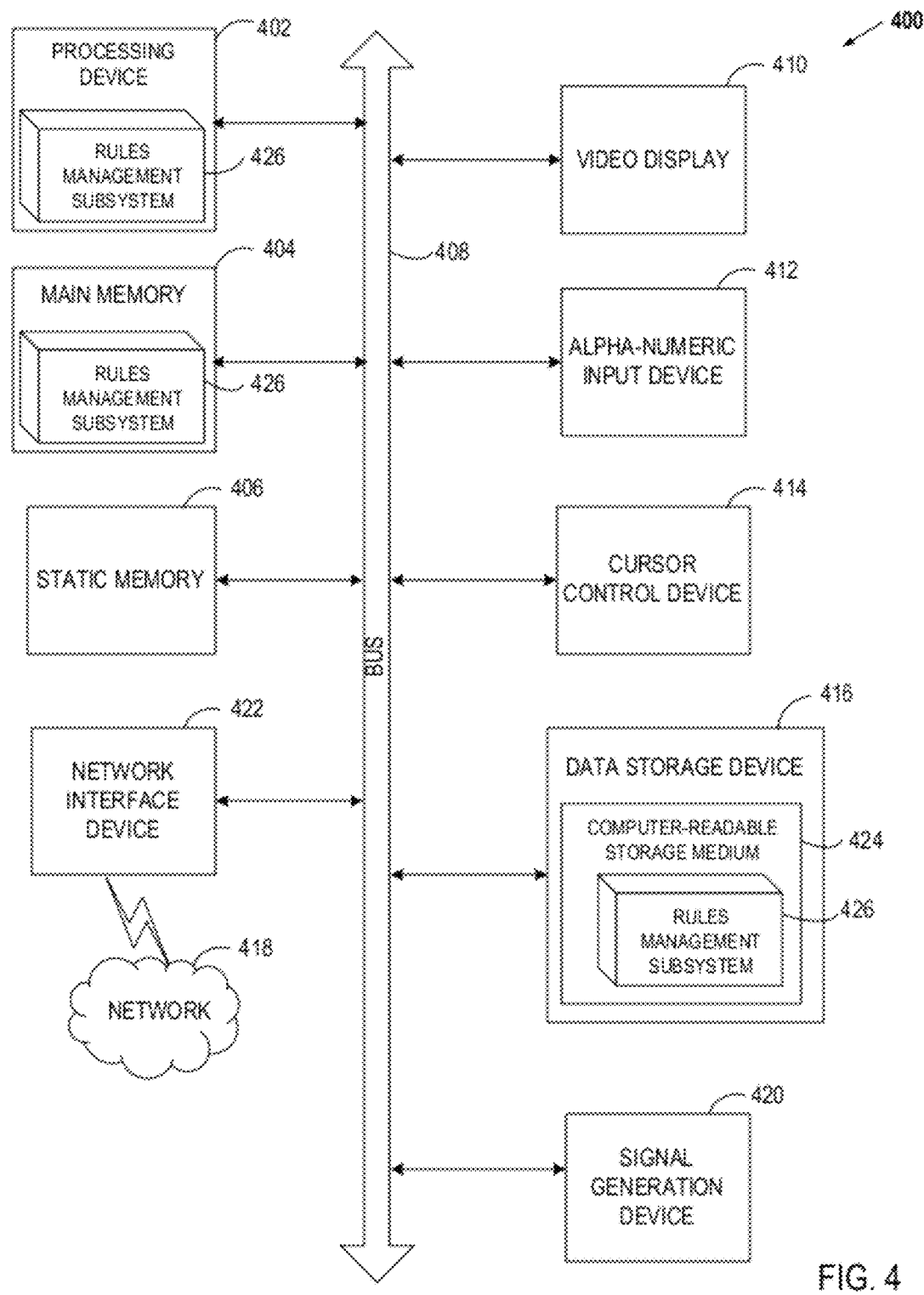
FIG. 4 is a diagram of one embodiment of a computer system for dynamically changing product business rules to enforce product business models.

FIG. 4 is a diagram of one embodiment of a computer system for dynamically changing product business rules to enforce product business models without changing the product code. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the rules management subsystem 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the rules management subsystem 426) embodying any one or more of the methodologies or functions described herein. The rules management subsystem 426 may also reside, completely or at least partially, within the main memory 404 and/or within the processing device 402 during execution thereof by the computer system 400, the main memory 404 and the processing device 402 also constituting machine-readable storage media. The rules management subsystem 426 may further be transmitted or received over a network 418 via the network interface device 422.

The computer-readable storage medium 424 may also be used to store the rules management subsystem 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The rules management subsystem 426, components and other features described herein (for example in relation to FIG. 1) can be implemented as discrete hardware components or integrated in the functionality of hardware components such as ASICS, FPGAs, DSPs or similar devices. In addition, the rules management subsystem 426 can be implemented as firmware or functional circuitry within hardware devices. Further, the rules management subsystem 426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "storing," "implementing," "determining," "receiving," "identifying," "comparing," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically generating code for dynamically changing product business rules to enforce product business models without changing the product code. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   defining, by a processing device of a management system, one or more parameters corresponding to entity system hardware requirements to execute a product, wherein the one or more parameters are stored as a new data file that is independent of a product code of the product;
   receiving, by the processing device, input changing the one or more parameters for the entity system hardware requirements to execute the product;
   without changing the product code of the product, updating, by the processing device, the one or more parameters in view of the received input;
   receiving, from a first entity system, a request to execute the product;
   in response to receiving the request to execute the product, determining, by the processing device of the management system, whether the first entity system satisfies the entity system hardware requirements to execute the product in view of consumer facts data associated with the first entity system, wherein the management system is separate from the first entity system; and
   in response to determining that the first entity system satisfies the entity system hardware requirements, providing, to the first entity system, an indication allowing the product to be executed by the first entity system.

2. The method of claim 1, further comprising:
   receiving a consumer entitlement request for a list of product subscriptions that are available to the first entity system, wherein the consumer entitlement request comprises an identity certificate;
   identifying the consumer facts data for the first entity system based on the identity certificate;
   comparing the consumer facts data to product data for one or more products to determine which product attributes in the product data are satisfied; and
   identifying one or more product subscriptions that are associated with the satisfied product attributes.

3. The method of claim 2, further comprising:
   sending a notification indicating one or more product subscriptions that are available to the first entity system.

4. The method of claim 1, further comprising:
   receiving a consumer entitlement request for an entitlement for the product to allow the first entity system to use the product, wherein the consumer entitlement request comprises a product identifier and an identity certificate;
   identifying the consumer facts data for the entity based on the identity certificate;
   identifying product data associated with the product identifier; and
   determining whether the consumer facts data satisfies one or more product attributes in the product data to grant the entitlement.

5. The method of claim 4, further comprising:
   sending a notification indicating whether the entitlement is granted.

6. The method of claim 1, wherein the one or more parameters of the first entity system comprise at least one of a system architecture type, a number of CPU sockets in the entity system, a number of populated CPU sockets in the entity system, or a number of cores in a CPU in the entity system.

7. A system comprising:
   a memory to store one or more parameters; and
   a processing device operatively coupled to the memory to:
      define, by a management system, the one or more parameters corresponding to entity system hardware requirements to execute a product, wherein the one or more parameters are stored as a new data file that is independent of a product code of the product;
      receive input changing the one or more parameters for the entity system hardware requirements to execute the product;
      without changing the product code of the product, update the one or more parameters in view of the received input;
      receive, from a first entity system, a request to execute the product;
      in response to receiving the request to execute the product, determine, by the management system, whether the first entity system satisfies the entity system hardware requirements to execute the product in view of consumer facts data associated with the first entity system, wherein the management system is separate from the first entity system; and
      in response to determining that the first entity system satisfies the entity system hardware requirements, provide, to the first entity system, an indication allowing the product to be executed by the first entity system.

8. The system of claim 7, wherein the processing device is further to:
   receive a consumer entitlement request for a list of product subscriptions that are available to the first entity system, wherein the consumer entitlement request comprises an identity certificate;
identify the consumer facts data for the first entity system based on the identity certificate;
compare the consumer facts data to product data for one or more products to determine which product attributes in the product data are satisfied; and
identify the one or more product subscriptions that are associated with the satisfied product attributes.

9. The system of claim 8, wherein the processing device is further to:
send a notification indicating one or more product subscriptions that are available to the first entity system.

10. The system of claim 7, wherein the processing device is further to:
receive a consumer entitlement request for an entitlement for a product to allow the first entity system to use the product, wherein the consumer entitlement request comprises a product identifier and an identity certificate;
identify the consumer facts data based on the identity certificate;
identify product data associated with the product identifier; and
determine whether the consumer facts data satisfies one or more product attributes in the product data to grant the entitlement.

11. The system of claim 10, wherein the processing device is further to:
send a notification indicating whether the entitlement is granted.

12. The system of claim 7, wherein the one or more parameters of the first entity system comprise at least one of a system architecture type, a number of CPU sockets in the entity system, a number of populated CPU sockets in the entity system, or a number of cores in a CPU in the entity system.

13. A non-transitory computer-readable storage medium including instructions that, when executed by a processing device, cause the processing device to:
define, by a management system, one or more parameters corresponding to entity system hardware requirements to execute a product, wherein the one or more parameters are stored as a new data file that is independent of a product code of the product;
receive, by the processing device, input changing the one or more parameters for the entity system hardware requirements to execute the product;
without changing the product code of the product, update, by the processing device, the one or more parameters in view of the received input;
receiving, from a first entity system, a request to execute the product;
in response to receiving the request to execute the product, determine, by the processing device of the management system, whether the first entity system satisfies the entity system hardware requirements to execute the product in view of consumer facts data associated with the first entity system, wherein the management system is separate from the first entity system; and
in response to determining that the first entity system satisfies the entity system hardware requirements, provide, to the first entity system, an indication allowing the product to be executed by the first entity system.

14. The non-transitory computer-readable storage medium of claim 13, wherein the processing device is further to:
receive a consumer entitlement request for a list of product subscriptions that are available to the first entity system, wherein the consumer entitlement request comprises an identity certificate;
identify the consumer facts data for the first entity system based on the identity certificate;
compare the consumer facts data to product data for the one or more products to determine which product attributes in the product data are satisfied; and
identify one or more product subscriptions that are associated with the satisfied product attributes.

15. The non-transitory computer-readable storage medium of claim 14, wherein the processing device is further to:
send a notification indicating one or more product subscriptions that are available to the first entity system.

16. The non-transitory computer-readable storage medium of claim 13, wherein the processing device is further to:
receive a consumer entitlement request for an entitlement for the product to allow the first entity system to use the product, wherein the consumer entitlement request comprises a product identifier and an identity certificate;
identify the consumer facts data for the entity based on the identity certificate;
identify product data associated with the product identifier; and
determine whether the consumer facts data satisfies one or more product attributes in the product data to grant the entitlement.

17. The non-transitory computer-readable storage medium of claim 16, wherein the processing device is further to:
send a notification indicating whether the entitlement is granted.

* * * * *